United States Patent
Kammerer et al.

(10) Patent No.: US 9,419,945 B2
(45) Date of Patent: Aug. 16, 2016

(54) SYSTEMS AND METHODS FOR PROVIDING AND OPERATING A SECURE COMMUNICATION NETWORK

(75) Inventors: Kurt Kammerer, Huefingen (DE); Volker Schmid, Blumberg (DE)

(73) Assignee: regify S.A., Luxembourg (LU)

( * ) Notice: Subject to any disclaimer, the term of this patent is extended or adjusted under 35 U.S.C. 154(b) by 910 days.

(21) Appl. No.: 13/334,079

(22) Filed: Dec. 22, 2011

(65) Prior Publication Data
US 2012/0173664 A1   Jul. 5, 2012

Related U.S. Application Data

(60) Provisional application No. 61/428,900, filed on Dec. 31, 2010.

(51) Int. Cl.
| | |
|---|---|
| *G06F 15/16* | (2006.01) |
| *H04L 29/06* | (2006.01) |
| *G06Q 30/04* | (2012.01) |
| *G06Q 30/06* | (2012.01) |
| *H04L 12/58* | (2006.01) |

(52) U.S. Cl.
CPC ............ *H04L 63/0414* (2013.01); *G06Q 30/04* (2013.01); *G06Q 30/06* (2013.01); *H04L 29/06* (2013.01); *H04L 51/00* (2013.01); *H04L 63/0272* (2013.01)

(58) Field of Classification Search
CPC ............................ H04L 25/03; H04L 63/0428
See application file for complete search history.

(56) References Cited

U.S. PATENT DOCUMENTS

| | | | |
|---|---|---|---|
| 6,266,704 B1 | 7/2001 | Reed et al. | |
| 2002/0152326 A1 | 10/2002 | Orshan | |
| 2002/0165815 A1* | 11/2002 | Vincent | G06Q 30/0601 705/37 |
| 2004/0153575 A1* | 8/2004 | Coggeshall | H04L 29/12018 709/245 |
| 2006/0023727 A1 | 2/2006 | George et al. | |
| 2008/0005264 A1 | 1/2008 | Brunell et al. | |

(Continued)

FOREIGN PATENT DOCUMENTS

| | | |
|---|---|---|
| EP | 1 752 918 A1 | 2/2007 |
| EP | 2 216 731 A2 | 8/2010 |

(Continued)

OTHER PUBLICATIONS

Apr. 29, 2013 Examination Report for related application EP 11 193 879.1.
Mar. 23, 2012 extended European search report for related application EP 11 193 879.1.
Nov. 28, 2013 Examination Report for related application EP 11 193 877.5.
Mar. 10, 2015 Examination Report for related application EP 11 193 877.5.
Sep. 15, 2015 Examination Report for related application JP 2011-276159.
EN language abstract for JP 2005-159911 A1 cited in related application JP 2011-276159.

*Primary Examiner* — Christopher Biagini
*Assistant Examiner* — Keyvan Emdadi

(57) ABSTRACT

A communication network comprises a first control node (101) and at least one second control node (103), wherein the first control node and the second control node form a first-level communication network (113) which communicatively couples the first control node to the second control node, wherein the first control node comprises a first intermediary node communication module (123) for forming a first second-level communication network (121) between the first control node (101) and a first intermediary node (105), wherein the first intermediary node communication module is adapted to receive an anonymous request (143) from the first intermediary node (105), the anonymous request (143) being based on a first user request (141) transmitted from a first user node (109) to the first intermediary node (105), wherein the first control node (101) is adapted to transmit the anonymous request (143) to the second control node (103).

14 Claims, 7 Drawing Sheets

(56) References Cited

U.S. PATENT DOCUMENTS

| | | |
|---|---|---|
| 2008/0244718 A1 | 10/2008 | Frost et al. |
| 2009/0172171 A1 | 7/2009 | Amir |
| 2012/0203856 A1* | 8/2012 | Wu .................... H04L 63/0407 709/206 |
| 2013/0054965 A1* | 2/2013 | Catrein ................. G06F 21/10 713/167 |
| 2013/0110344 A1* | 5/2013 | Merg ..................... G07C 5/008 701/31.4 |

FOREIGN PATENT DOCUMENTS

| | | |
|---|---|---|
| JP | 2005-159911 A | 6/2005 |
| WO | 03/055175 A1 | 7/2003 |

* cited by examiner

SYSTEMS AND METHODS FOR PROVIDING AND OPERATING A SECURE COMMUNICATION NETWORK

FIELD OF THE INVENTION

The present invention relates to a first control node, to a second control node, to a communication network, to a first communication method, to a second communication method, to a program element and to a computer-readable medium, wherein the first control node forms a first-level communication network with the second control node to transmit anonymous data received from a first intermediary node. The first control node, the second control node, the communication network, the first method, and the second method may for example be employed for secure data transmission, such as email transmission, or any other content-related data transmission.

BACKGROUND OF THE INVENTION

E-commerce and transactions of all kinds require communication that is secure and indisputable. In case electronic communication is used to effect such transactions, confidentiality, identification of sender/recipient and message integrity of such communication must be ensured electronically, and relevant communication events must be registered in a non-repudiation protocol for reasons of traceability. Legal and business demands must be satisfied, and data privacy as defined by applicable law or by individual users or user groups must be maintained at the same time. Examples for such transactions can be the transmission of e-invoices, the management of purchasing transactions or the execution of digital postal services, such as trusted and binding e-mail. Challenges are manifold and may be met using embodiments of the invention, in particular by adopting a new flexible architectural approach with innovative technical processes according to embodiments of the invention.

WO 2007073943 A1 discloses a communication system comprising a sender unit, a recipient unit and a control unit, wherein the sender unit is adapted to generate an electronic message, to send the electronic message directly to the recipient unit, and to send a sending information message to the control unit indicating that the sender unit has sent the electronic message to the recipient unit, wherein the recipient unit is adapted to receive the electronic message directly from the sender unit and to send a receipt information message to the control unit, the receipt information message indicating that a user of the recipient unit has received the electronic message.

WO 2007073943 A1 furthermore discloses that a provider may communicate with the sender unit in a manner that the provider knows the identity of a user of the sender unit. However, in contrast to this, a communication between the first control entity and the second control entity regarding the sender unit may be anonymous so that the identity of the sender unit will not be known to the second control entity.

There may be a need for a first node, a second node, a communication network, a first communication method, and a second communication method which may be employed to in particular improve a method for secure data transfer or data transmission.

Further, there may be a need for a communication network comprising a first control node and a second control node, which enables administering transaction-related data and/or content-related data in an anonymous manner, in particular taking into account regulations in different jurisdictions, such as in different political countries.

To meet at least one of the above needs, a first node, a second node, a communication network, a first communication method and a second communication method are provided according to the independent claims.

SUMMARY OF THE INVENTION

According to an embodiment of the present invention, a first control node (such as a computer, a computer cluster or a distributed computer system) is provided, wherein the first control node comprises a first control node communication module (in particular comprising means for setting up a private and secure communication channel, such as a virtual private network (VPN) communication channel) for forming a first-level communication network (in particular a private network which is not accessible by other parties) with at least one second control node (wherein in particular the second control node may be configured in a similar or same way as the first control node, in particular also comprising a computer, a computer cluster or a distributed computer system); and a first intermediary node communication module (in particular comprising means for setting up a secure, safe and/or private communication channel) for forming a first second-level communication network (which is in particular different from the first-level communication network and which is in particular not accessible from the first-level communication network and which is not accessible by any other third parties) with a first intermediary node (the first intermediary node in particular comprising a computer, a computer cluster and/or a distributed computer system).

In particular, the first control node and the second control node (or one or more second control nodes, such as 2, 3, 4, 5, 6 or 6 to 500 second control nodes) form a first-level communication network which allows secure data exchange between the first control node and the second control node without the risk that the exchanged data are intercepted by a third party. In particular, the first control node may be placed in a first jurisdiction or political country and the second control node may be placed in a second jurisdiction or political country different from the first jurisdiction or first political country, respectively. In particular, placing the first control node and the second control node in different political countries or jurisdictions being spaced apart may allow the first control node to keep, maintain or store data within the domain control of the first political country or region, wherein the second control node may maintain, keep or store data within the domain control of the second political country or region. In particular, it may be prohibited that data confidential to the first political country are maintained, or stored in the second node which is located outside of said first political country or region. Thereby, data safety and governance capabilities may be improved.

In particular, the first control node and/or the second control node may be enabled to register events (such in a event registry storage) performed by the first user node and/or a second user node, thereby allowing traceability, such as e.g. for billing or charging. The events may be related to transactions (in particular involving transfer or access to content data) performed by or between the first user node and/or by the second user node. In particular, the first control node and/or the second control node may be enabled or adapted to store or maintain transaction related data (such as a decryption key, access information, integrity related data and the like) related to the transactions. Further, registering events may provide a basis for metering the usage of a particular application or content data by the first user node. Metering data may be maintained at the first control node and/or the second control node in an anonymous form, while the first intermediary node may be adapted to collect metering data from the first control node (or further control node) to assemble a transaction history of transaction records specific for the first user node.

The first intermediary node communication module is adapted (i.e. is in particular configured, such as by hardware installed at and/or a program running on the first control node) to receive an anonymous request (or anonymized request, wherein the request may be represented by electric or electronic data sent by the first intermediary node, wherein the electronic signals may represent request data in particular defining a request type, and request parameters defining what kind of data are asked for, wherein the anonymous request may not allow to determine an identity of the first user node or an identity of a person employing the first user node to transmit the request from the first intermediary node (via the first second-level communication network which is commutatively separated from the first-level communication network), the anonymous request being based on (or being derivable from) a first user request (defining in particular a request for particular data, such as data for decrypting particular content-related data) transmitted from a first user node (in particular comprising a computer, a computer cluster or a distributed computer system or comprising in particular a desk top computer or a notebook computer or a mobile phone) to the first intermediary node.

In particular, the first user request transmitted from the first user node to the first intermediary node may comprise personal data identifying the first user node or a user employing the first user node. Thus, in particular, the first user request may not be anonymous. However, the first intermediary node may be adapted to derive the anonymous request from the first user request, in particular by abstracting identification related data from the user request or by decrypting the personal-related data of the first user request. Thus, the first control node does not obtain any identification data of the first user node, thereby maintaining in particular the privacy of data at the first intermediary node. However the anonymous request may comprise information indicative of a location of the first user node and/or indicative of a Internet domain the first user node is associated with.

Thereby, the first control node communication module is adapted (i.e. in particular configured by particular hardware means and/or software means) to transmit, via the first-level communication network, the anonymous request to the second control node (thus, also the second control node does not get access to the private data identifying the first user node); and to receive, via the first-level communication network, anonymous response data, responding to the anonymous request, from the second control node. Thereby, transmission of anonymous data between the first control node and the second control node located in particular in different jurisdictions is enabled.

Thereby, the first intermediary node communication module is further adapted to transmit the anonymous response data, via the first second-level communication network, to the first intermediary node for transmission of response data which are based on the anonymous response data to the first user node. In particular, the response data which are based on the anonymous response data and which are transmitted from the first intermediary node to the first user node may not be anonymous and in particular not encrypted but may be personalized and in particular unencrypted in that they may comprise identification data for identifying a user. Further, all communication between the intermediary node and a user node may be not encrypted. In particular, the anonymous response data do not enable to determine an identity of the first user node and do not enable to determine an identity of a user employing the first user node. Thus, in particular, neither the first control node nor the second control node obtains data which enable identification of the first user node. Further, neither the first control node nor the second control node maintains or stores data which enable identifying the first user node or a user employing the first user node. In particular, person-related data may only available at the first intermediary node but neither at the first control node nor at the second control node.

In particular, the first intermediary node may be adapted to derive the response data based on the anonymous response data. In particular, the response data may contain person-related data which may enable identifying the first user node. In particular, the response data may comprise data indicative for decrypting content data which may have been received by the first user node via any transaction method, such as by Internet communication, by file transfer protocol (ftp), email, or any other method for transporting data.

According to an embodiment, the first control node further comprises a first storage for storing data (in particular storing anonymous data), wherein the first storage is searchable (i.e. may be searched), based on the anonymous request, for the anonymous response data. In particular, the anonymous request may define a query for querying a database comprised in the first control node, the database holding the data of the first storage. In particular the anonymous request may comprise a hashcode of content data and/or a hashcode of data indicative of an identity of the first user node or indicative of an identity of a user employing the first user node.

In particular instances the first storage may contain the anonymous response data. In this case, searching for the anonymous response data using the anonymous request defining a query may retrieve the anonymous response data. In this case the first control node itself may transmit the anonymous response data, via the first second-level communication network, to the first intermediary node, wherein it may not be required to forward the anonymous request to the second control node. In particular, forwarding the anonymous request from the first control node to the second control node may also be referred to as roaming the anonymous request to the second control node.

According to an embodiment of the present invention, the first control node is adapted to transmit, via the first-level communication network, the anonymous request to the second control node, if the anonymous response data are not contained in the first storage. In particular, in this case, querying the first storage for the anonymous response data is not successful indicating that the anonymous response data are not contained within the first storage. In this case, when the first control node does not contain the anonymous response data asked for, the first control node may forward or roam the anonymous request to one or more second control nodes, in particular in a parallel manner or in a serial manner (i.e. subsequently). In particular, roaming the anonymous request may be preceded by a decision or determining step to decide or to determine, whether the anonymous response data are contained in the first storage.

According to an embodiment, the first control node is adapted to retrieve the anonymous response data from the first storage, if the anonymous response data are contained in the first storage, and to transmit, via the first second-level communication network, the anonymous response data to the first intermediary node. In this case, roaming the anonymous request may not be required, thus simplifying the transmission method and thus simplifying the first control node.

According to an embodiment, the first control node communication module is adapted to receive, via the first-level communication network, a denial message from the second control node, the denial message indicating that access to the anonymous response data at the second control node is denied. Thus, the first control node communication module or the first control node in its entirety may be adapted to be prepared for receiving either the anonymous response data or the denial message requiring means for distinguishing between the anonymous response data and the denial message. In particular, the denial message also does not comprise any data which allow identification of the first user node or identification of a user employing the first user node. In particular, a denial message may be transmitted from the second control node to the first control node, if the anonymous response data are marked as confidential such that the anonymous response data must not be transmitted from the second control node to the first control node. Thus, even if the anonymous response data do not allow identifying the first user node the anonymous response data may be confidential.

Further, in case the second control node does not contain the requested anonymous response data, it may send a message to the first control node indicating that the second control node does not contain the requested anonymous response data or may also in this case send a denial message to the first control node.

According to an embodiment, the first intermediary node communication module is further adapted to transmit, via the first second-level communication network, data indicative of the denial message to the first intermediary node. In particular, the denial message or the data indicative of the denial message, may be anonymous data not allowing to identify the first user node. However, based on the data indicative of the denial message, the first intermediary node may determine the identity of the first user node. In particular, the data indicative of the denial message may comprise data related to an identification of the anonymous request sent from the first intermediary node to the first control node. Thereby, using the request identification data comprised in the data indicative of the denial message the first intermediary node may indirectly determine the identity of the first user node.

According to an embodiment, the anonymous request represents encrypted data, in particular asymmetrically encrypted data, wherein the first control node comprises a decryption module for decrypting the encrypted data. In particular, the first control node may receive the anonymous request as data encrypted with a public key of the first control node. In particular, the first control node may decrypt the anonymous request represented in encrypted data using the private key of the first control node. Thereby, the data transmission may be performed in a highly secure and safe manner.

According to an embodiment, the first-level communication network is a private network (not accessible by for example a public network, such as the Internet), in particular a virtual private network (VPN), neither accessible by the first intermediary node nor accessible by the first user node. Thereby, data safety and security may further be improved.

According to an embodiment, also the first second-level communication network is a private network, in particular a virtual private network, neither accessible by the second control node nor accessible by the first user node. In particular, the first-level communication network and the first second-level communication network may be communicatively separated and/or independent communication networks.

According to an embodiment, the first control node communication module is adapted to form a further first-level communication network with a further control node of the at least one second control node, the first-level communication network being communicatively separated from the further first-level communication network. In particular, it may not be possible for the second control node to communicate with the further control node via the first control node. Further, it may not be possible for the further control node to communicate with the second control node via the first control node. For the second control node to communicate with the further control node either the second control node and the further control node are required to establish a still further first-level communication network or the first control node must be particularly configured to allow such communication from the second control node to the further control node or vice versa. By default, however, communication between the second control node and the further control node via the first control node may be disabled.

In particular, the second control node (or a network of such second control nodes) may serve (or support) requests related to a particular type of transaction, such as e.g. related to a set of applications, while the further control node (or a network of such further control nodes) may serve (or support) requests related to another type of transaction, such as e.g. related to another set of applications.

According to an embodiment, the first control node communication module is adapted to transmit, via the further first-level communication network, the anonymous request to the further control node of the at least one second control node. Thereby, forwarding the anonymous request, in particular roaming the anonymous request, to more than one second control node is enabled in order to distribute the anonymous request to a large number of control nodes of the at least one second control node. Thereby, a chance or a probability that one of the control nodes contains or stores the requested anonymous response data may be increased.

According to an embodiment of the present invention, the first control node is adapted to transmit, via the further first-level communication network, the anonymous request to the further control node in a parallel manner with the transmission, via the first-level communication network, of the anonymous request to the second control node. Thereby, the transmission of the anonymous request to more than one second control node may be accelerated, thereby also accelerating reception of the anonymous response data.

According to an embodiment, the first control node is further adapted to selectively, based on the anonymous request and/or based on a previous response received from the second control node and/or received from the further control node, transmit the anonymous request to one of the second control node and the further control node. In particular, the first control node may be adapted to select one of the at least one second control node, wherein a probability or a chance of finding the anonymous response data is increased for the selected one of the at least one second control node. In particular, the selection may be based on learning by evaluating response data received from the at least one second control node.

In particular, the anonymous request may comprise a data pattern which may allow to derive a location of the first user node. In particular, the data pattern may allow to derive the jurisdiction or the political country the first user node is located in. Alternatively, the anonymous request may contain a data pattern from which a location, a jurisdiction or a political country in which the second user node is located may be derived. In particular, a particular data pattern comprised in the anonymous request may indicate that a particular control node of the at least one second control node may provide or may store the anonymous response data asked for. In particular, a correlation of the data pattern comprised in the anonymous request and a particular one of the at least one second control node may be learned by the first control node. In particular, forwarding the anonymous request from the first control node to a particular control node of the at least one second control node may be performed, wherein the correlation of the data pattern with the particular control node is highest.

In particular, the first control node may be adapted to determine an order of control nodes of the at least one second control node to which the anonymous request may be transmitted subsequently, wherein the order may be defined such that the chance of receiving the anonymous response data from a second control node is higher for a particular control node than for another control node arranged in the ordered list behind the particular control node.

According to an embodiment, the anonymous response data is indicative of content-related data which are related to content. In particular, the content may be provided by a second user node to the first user node by any transaction or transmission method, such as by file transfer protocol transmission, email transmission, wire-based transmission, wireless transmission, tcp/ip-transmission, http-transmission, transfer of a storage medium or the like. In particular, the anonymous response data may itself not contain any content that is usable by the first user node. In particular, the anonymous response data may be adapted to allow the first user node or allow a user employing the first user node to access or read or decrypt the content, wherein the content may be provided (in particular in encrypted form) by the second user node to the first user node.

According to an embodiment, the content-related data comprises at least one of a key for decryption of encrypted content (provided by the second user node to the first user node), an identification for identifying the content, a code (such as a checksum or a hashcode) of the content. Herein, a checksum or a hashcode may also refer to a result of applying a cryptographic hash function on input data. The cryptographic hash function (such as SHA-256) may produce from input data a message digest which may have a fixed length, such as 256 bit. In particular, the hashcode may employ a secure hash algorithm which may be adapted to calculate an unambiguous check value for arbitrary electronic input data. In particular, the SHA-256 algorithm may be employed to derive a hashcode or a checksum. In particular, the content-related data received by the first user node may enable the first user node to access, read and/or decrypt the content (previously or simultaneously) received from the second user node.

According to an embodiment, the content is one of audio content, textual content and video content. In particular, the content may be provided at the internet to the first user node or may be directly sent to the first user node.

According to an embodiment, a second control node, in particular in combination with the first control node of which embodiments are described above, is provided, wherein the second control node comprises a second control node communication module for forming a first-level communication network with at least one first control node (or a plurality of first control nodes); and a second storage for storing control node data, wherein the second control node communication module is adapted to receive, via the first-level communication network, an anonymous request from the first control node (which may in particular have received the anonymous request from the first intermediary node), wherein the second storage is adapted to retrieve, based on the anonymous request, anonymous response data, responding to the anonymous request, from the second storage, wherein the second control node communication module is adapted to transmit, via the first-level communication network, the anonymous response data to the first control node.

In particular, the first control node may then transmit the anonymous response data to the first intermediary node, as described above with respect to embodiments of the first control node. In particular, the second control node may be communicatively coupled to a second intermediary node which may be communicatively coupled to a second user node. In particular, the second user node may have previously transmitted data via the second intermediary node to the second control node which data may finally be indicative of the anonymous response data.

According to an embodiment, the second control node is further adapted to transmit, via the first-level communication network, a denial message to the first control node, the denial message indicating that access to the anonymous response data at the second control node is denied, wherein the denial message is transmitted, if an access condition is not satisfied. In particular, the second control node may contain the anonymous response data in the second storage but may not allow transmission of the anonymous response data to the first control node, since the anonymous response data may be confidential to the second control node. In particular, the access condition may be defined or implied by the second control node, by the second intermediary node, by the second user node and/or by another party. Thereby, data security may be further improved.

According to an embodiment, the access condition comprises an access criterion controlled by the second control node. In particular, the access criterion may be controlled by an operator or by a provider of the second control node. Thereby, great flexibility and data security may be achieved.

According to an embodiment, the second control node further comprises a second intermediary node communication module for forming a second second-level communication network with a second intermediary node, wherein the second intermediary node communication module is adapted to receive anonymous transaction-related data from the second intermediary node, wherein the second storage is adapted to store the anonymous transaction-related data and wherein the anonymous transaction-related data are indicative of the anonymous response data.

In particular, the anonymous transaction-related data may be indicative of a transaction of data from the second user node to the first user node or may be indicative that at least the second user node has provided access (potentially in encrypted form) of the content to the first user node. In particular, providing the content by the second user node to the first user node may not necessarily mean that the first user node has gained access or has read the content. In particular, the first user node may not be enabled to access or read the content, before the first user node receives the response data after requesting the response data from the first intermediary node. Only the received response data may enable the first user node to read the content, in particular by decrypting encrypted content.

According to an embodiment, the anonymous transaction-related data are further indicative of an access criterion controlled by the second intermediary node, wherein the access condition comprises the access criterion controlled by the second intermediary node. Thereby, the access condition may be flexibly defined, thus improving the data security.

According to an embodiment, the anonymous transaction-related data are further indicative of an access criterion controlled by a second user node, wherein the access condition comprises the access criterion controlled by the second user node, wherein the anonymous transaction-related data received from the second intermediary node are based on transaction-related data transmitted from the second user node to the second intermediary node.

In particular, the second user node may be communicatively coupled to the second intermediary node to transmit the transaction-based data to the second intermediary node. In particular, the transaction-related data may enable to identify a transaction (of data or a process of providing the data). In particular, the transaction-related data may comprise an identification code, a checksum or a hashcode of the content, and/or a hashcode or a checksum of an identification of the first user node, wherein the first user node may also be considered as a recipient of the content provided by the second user node, which may also be considered as a sender of the content.

According to another aspect of the present invention, a communication network is provided comprising a first control node, in particular a first control node according to one of the embodiments as described above; and at least one second control node, in particular a control node according to one of the above-described embodiments, wherein the first control node and the second control node form a first-level communication network which communicatively couples the first control node to the second control node, in particular in a private manner restricting access to third parties.

In particular, the first control node may be configured as described above in the context of embodiments of the first control node and the second control node may be adapted as described with reference to embodiments of the second control node. Therein, the first control node comprises a first intermediary node communication module for forming a first second-level communication network between the first control node and a first intermediary node, wherein the first intermediary node communication module is adapted to receive an anonymous request from the first intermediary node, the anonymous request being based on a first user request transmitted from a first user node to the first intermediary node. Therein, the first control node is adapted to transmit the anonymous request to the second control node, wherein the second control node is adapted to receive the anonymous request from the first control node, to determine anonymous response data responding to the anonymous request, and to transmit the anonymous response data to the first control node. Therein, the first control node is adapted to receive the anonymous response data from the second control node, wherein the first intermediary node communication module is further adapted to transmit the anonymous response data to the first intermediary node for transmission of response data which are based on the anonymous response data, to the first user node.

According to an embodiment, the communication network further comprises the first intermediary node, wherein the first second-level communication network is a private network communicatively separated from the first-level communication network. Thus, access of the first intermediary node to the second control node may be restricted by providing the communicatively separated communication networks.

According to an embodiment, the communication network further comprises a second intermediary node, wherein the second control node further comprises a second intermediary node communication module for forming a second second-level communication network between the second control node and the second intermediary node, wherein the second intermediary node communication module is adapted to receive anonymous transaction-related data from the second intermediary node, wherein the second control node comprises a storage to store the anonymous transaction-related data and wherein the anonymous transaction-related data are indicative of the anonymous response data. In particular, the anonymous response data may be derivable based on the anonymous transaction-related data.

According to an embodiment, the communication network further comprises the first user node communicatively coupled to the first intermediary node via a public communication network (such as the internet); and a second user node communicatively coupled to the second intermediary node via the public communication network, wherein the second user node is adapted to transmit transaction-related data to the second intermediary node, wherein based on the transmitted transaction-related data the second intermediary node derives the anonymous transaction-related data to be transmitted to the second control node. In particular, the transaction-related data may identify a transaction and/or a transmission of data from the second user node to the first user node. In particular, the transaction-related data may be anonymized (made anonymous) by the second intermediary node in order to derive the anonymous transaction-related data to be transmitted to the second control node.

According to an embodiment of the communication network, the second user node is adapted to provide access, upon a transaction, of encrypted content data to the first user node, wherein upon providing the encrypted content data to the first user node, the second user node transmits the transaction-related data, being related to the transaction of the encrypted content data, to the second intermediary node. In particular, the content data may also be referred to as content within the present application.

In particular, the transaction-related data may comprise an encryption key or a decryption key, wherein this key enables the first user node to decrypt the encrypted content data. In particular, the decryption key or encryption key may be transmitted from the second user node to the second intermediary node in an encrypted manner. In particular, the key may be transmitted from the second user node via the second intermediary node to the second control node and from there, upon request, via the first control node and via the first intermediary node to the first user node.

According to an embodiment of the communication network, the second user node is adapted to generate the encrypted content data for transmission to the first user node. In particular the encrypted content data may be transmitted using any transfer protocol or technology, such as using email, using ftp, using mms, using sms, using icq or the like. Thus, in particular the first user node may receive an email containing encrypted content data.

According to an embodiment of the communication network, the transaction-related data are indicative of a decryption key for decrypting the encrypted content data. Thus, in particular the first user node may only be enabled to read the content data after having received the transaction-related data (in the form as the response data) which may contain the decryption key for decrypting the encryption content data, such as the email data.

According to an embodiment of the communication network, the transaction-related data are further indicative of a hashcode of the content data. Including the hashcode of the content data may be necessary for identifying the decryption key based on the anonymous request which request is later on transmitted from the first user node via the first intermediary node as the anonymous request to the first control node. In addition, comparing hashcodes of content data may also allow to prove the integrity of the content data, such as to ensure that the content data reached the first user node unaltered compared to the content data provided by the second user node.

According to an embodiment of the communication network, the transaction-related data are further indicative of a hashcode of an identification information identifying the first user node. Thereby, querying for the anonymous response data may be enabled. In addition, comparing hashcodes of user node identification may also serve for authentication purposes.

According to an embodiment of the communication network, the first user request transmitted from the first user node to the first intermediary node is indicative of the hashcode of the content data. Thus, both, the transaction-related data transmitted from the second user node via the second intermediary node to the second control node and also the first user request transmitted from the first user node via the first intermediary node to the first control node may both be indicative of the hashcode of the content data. Thereby, querying the storage of the first control node and/or the storage of the second control node may be enabled or facilitated.

According to an embodiment of the communication network, the first user request transmitted from the first user node to the first intermediary node is indicative of the identification information identifying the first user node. Thereby, querying for the response data may be further simplified.

According to an embodiment of the communication network, the first control node, the second control node and the second intermediary node are adapted, upon receiving the anonymous request data and/or upon transmitting the anonymous response data to the first intermediary node, to transmit an access notification from the first control node via the second control node and via the second intermediary node to the second user node, wherein the access notification indicates that the first user has accessed (or read or decrypted) the content data. In particular, the access notification may be considered as a confirmation that the content data or the content has been successfully transmitted to the first user node and that the first user node has successfully decrypted the encrypted content data.

According to an embodiment of the communication network, the first user node is adapted to provide access to the content data (for example to provide access to the content data for a user employing the first user node) by decrypting the encrypted content data by means of the decryption key derived from the response data. In particular, without having the decryption key at hand, the encrypted content data may be worthless for the first user node. In particular, transmitting the anonymous response data may trigger charging the first control node for a particular payment corresponding to the content data. In particular, an invoice may be generated and may be transmitted to the first user node.

According to an embodiment of the communication system, at least one of the first control node, the second control node, the first intermediary node, the second intermediary node, the first user node and the second user node comprises at least one of the group consisting of a server computer, a client computer, a desktop computer, a laptop computer, a personal digital assistant, a server computer, and a mobile phone.

According to an embodiment of the communication system, the first-level communication network is formed such that the first control node is located at a first control node location and the second control node is located at a second control node location, wherein the first control node location is spaced apart from the second control node location by a distance between 2 km and 20000 km, in particular 10 km and 20000 km, further in particular between 300 km and 20000 km. In particular, the first control node and the second control node are distributed at different locations on the surface of the earth. In particular, the first control node and the second control node may be located in different continents or in different political countries.

According to an embodiment of the communication system, the first control node location is within a first jurisdiction region and the second control node location is within a second jurisdiction region different from the first jurisdiction region. In particular, the first and the second jurisdiction regions may adopt different security and/or tax regulations which may be satisfied by the first control node and the second control node by appropriately configuring the first control node and the second control node according to different regulations, respectively.

It should be understood that features (individually or in any combination) disclosed, described, mentioned, explained or applied to a first control node, to a second control node, or to a communication network may also be applied (individually or in any combination) for an embodiment of a first communication method and a second communication method described below or vice versa.

According to an embodiment, a first communication method is provided which comprises providing a first control node comprising a first control node communication module for forming a first-level communication network with at least one second control node, and a first intermediary node communication module for forming a first second-level communication network with a first intermediary node; transmitting a first user request from a first user node to the first intermediary node; receiving, by the first intermediary node communication module, an anonymous request from the first intermediary node, the anonymous request being based on the first user request; transmitting, by the first intermediary node communication module via the first-level communication network, the anonymous request to the second control node; receiving by the first control node, via the first-level communication network, anonymous response data, responding to the anonymous request, from the second control node; and transmitting, by the first intermediary node communication module, the anonymous response data, via the first second-level communication network, to the first intermediary node for transmission of response data which are based on the anonymous response data to the first user node.

According to another aspect, a second communication method is provided, which comprises providing a second control node comprising a second control node communication module for forming a first-level communication network with at least one first control node, and a second storage for storing control node data; receiving, by the second control node communication module via the first-level communication network, an anonymous request from the first control node; retrieving, by the second storage, based on the anonymous request, anonymous response data, responding to the anonymous request, from the second storage; and transmitting, by the second control node communication module via the first-level communication network, the anonymous response data to the first control node.

According to another embodiment of the present invention, a communication method comprises the method steps of the first communication method as described above and the method steps of the second communication method as described above.

According to further aspects of the present invention, a program element and a computer-readable medium are provided, wherein when the program element is executed by a processor, the program element is adapted to control or carry out the first communication method, the second communication method and/or the communication method as described above.

Embodiments of the present invention, findings and considerations by the inventors and comparative examples by the inventors are now described with reference to the accompanying drawings. The embodiments of the present invention are not restricted to the illustrated and described embodiments. Similar elements in the drawings are labelled with similar reference sign differing only in the first digit.

Similar elements or components in the illustrated embodiments, findings by the inventors or comparative examples are labelled by the same reference signs differing only in the first digit. It should be understood that features disclosed in the context of findings and/or considerations by the inventor may also be (individually or in any combination) applied to embodiments of the present invention and the features disclosed in the context one embodiment of the present invention may (individually or in any combination) also be applied to another embodiment of the present invention.

DETAILED DESCRIPTION OF EMBODIMENTS OF THE INVENTION AND FINDINGS BY THE INVENTORS

Figure 1:
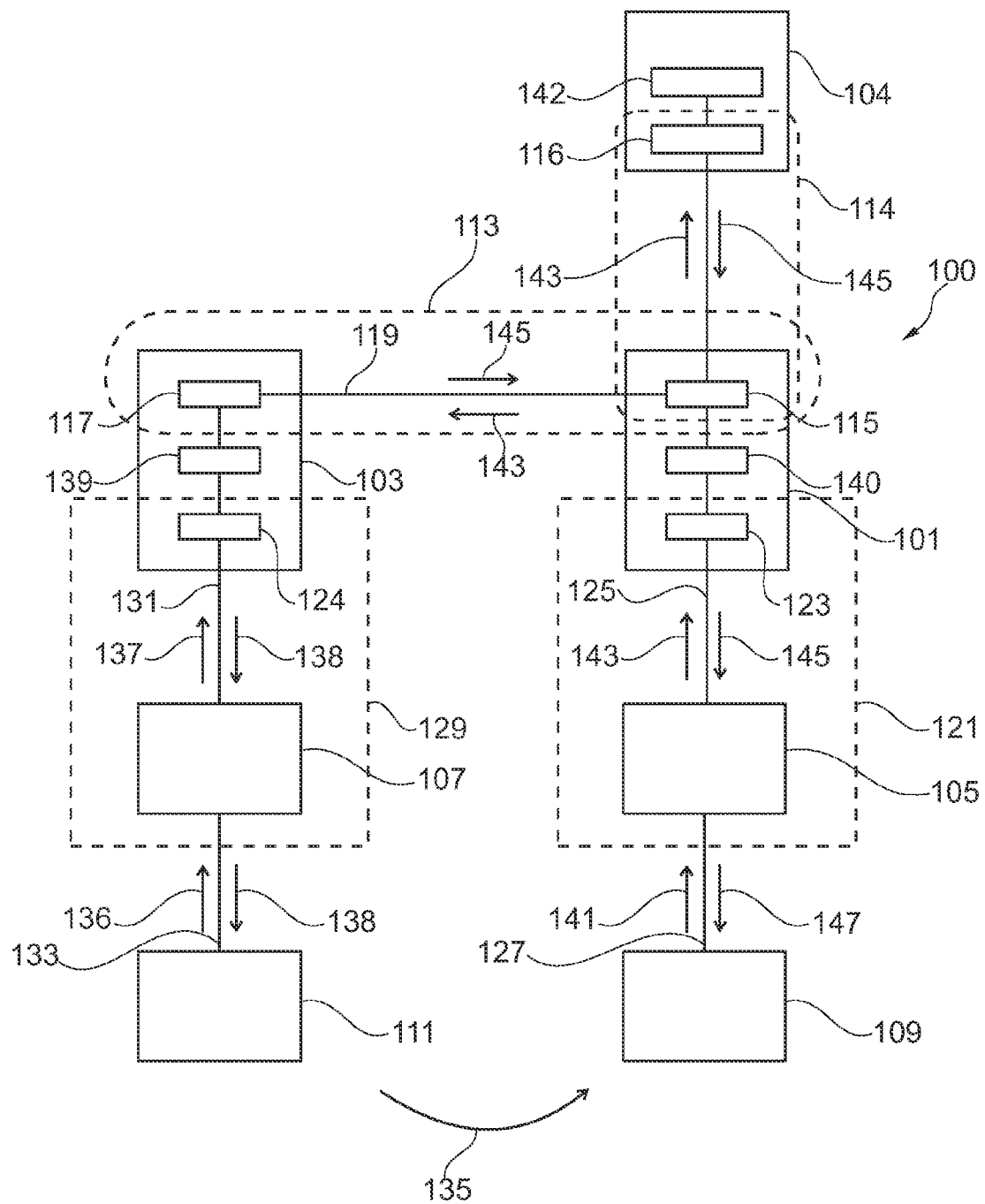
FIG. 1 schematically illustrates a communication network according to an embodiment of the invention.

FIG. 1 schematically illustrates a communication network 100 according to an embodiment of the present invention. The communication network 100 comprises a first control node 101, a second control node 103, a first intermediary node 105, a second intermediary node 107, a first user node 109 and a second user node 111. The first control node 101 and the second control node 103 form a private network 113, wherein for allowing data communication within the private network 113 (which is also referred to as first-level communication network), the first control node 101 comprises a first control node communication module 115 and the second control node 103 comprises a second control node communication module 117. The first control node communication module 115 and the second control node communication module 117 establish a data exchange channel 119 for exchanging data between the first control node 101 and the second control node 103. The first-level communication network 113 may in particular be a virtual private network.

The first control node 101 and the first intermediary node 105 form a first second-level communication network 121 for which the first control node 101 comprises a first intermediary node communication module 123. The first second-level communication network 121 may for example be a virtual private network (VPN) which allows data communication between the first control node 101 and the first intermediary node 105 via the communication channel 125.

The first intermediary node 105 and the first user node 109 are communicatively coupled by a public network, such as the internet. Thereby, data exchange between the first intermediary node 105 and the first user node 109 is enabled via the communication channel 127.

The second control node 103 and the second intermediary node 107 form a second second-level communication network 129, wherein data between the second control node 103 and the second intermediary node 107 may be exchanged via the communication channel 131. In particular, the second second-level communication network 129 may also be a virtual private network.

In particular, the networks 113, 121 and 129 are communicatively separated from each other such that for example the first intermediary node 105 is not enabled to communicate via the first control node 101, and via the second control node 103 directly with the second intermediary node 107. The first intermediary node 105 is only enabled to directly communicate with the first control node 101. Further, no other third party is enabled to access any of the private communication networks 113, 121 and 129. Thereby, data security may be ensured within each of the communication networks 113, 121 and 129.

Further, the second intermediary node 107 is communicatively coupled to the second user node 111 via a public communication network, such as the internet for exchanging data via a communication channel 133.

The second user node 111 may provide content or content data 135 (in particular in an encrypted form) to the first user node 109. Thereby, the provision of the content data or of the content 135 may be performed by any transmission method such as by transmitting an email, by transmitting data using a file transfer protocol (ftp), transmission of data using tcp/ip or http or by just providing some data on a portal or website in the Internet.

Upon providing the first user node 109 with content 135 in an encrypted form the second user node 111 may transmit transaction-related data 136 via the communication channel 133 to the second intermediary node 107. The second intermediary node 107 receives the transaction-related data and derives therefrom anonymized or anonymous transaction-related data 137, wherein the anonymous transaction-related data do not allow to determine an identity of the second user node 111. The anonymous transaction-related data 137 are transmitted from the second intermediary node 107 via the private communication channel 131 to the second control node 103, in particular to the second intermediary node communication module 124. Therein, the anonymous transaction-related data are labelled by reference sign 137. The second intermediary node communication module 124 receives the anonymous transaction-related data 137 and stores the anonymous transaction-related data 137 in the storage 139 of the second control node 103. In particular, the transaction-related 137 data may comprise a decryption key for decrypting the content data 135 which have been sent in an encrypted form to the first user node 109. Further, the transaction-related data 137 may comprise in particular a hashcode of the content data 135, a transaction identification number and/or a hashcode of an identification of the first user node 109. These data portions may be required for subsequent querying the storage 139 for response data which relate to the transaction-related data, in particular relate to the anonymous transaction-related data. In particular, also the second control node 103 is not enabled to determine an identity of the second user node 111.

Having provided the first user node 109 with the content data 135 in an encrypted form the first user node 109 transmits a request 141 to the first intermediary node 105. The request 141 may in particular comprise a hashcode of the received content data (which are in an encrypted form), a hashcode of an identity of the first user node 109 and further data. In particular, the request 141 may be as well in an encrypted form and also the transaction-related data 136 may be in an encrypted form.

The first intermediary node 105 receives the request 141 and forms based on the request an anonymous request 143 which does not allow to determine the identity of the first user node 109. The anonymous request 143 is transmitted to the first control node 101, wherein the first intermediary node communication module 123 receives the anonymous request 143. The first control node 101 then searches its first storage 140 for the requested anonymous response data.

If the anonymous response data responding to the anonymous request 143 are not found within the first storage 140, the first control node 101 forwards (or roams) the anonymous request 143 to the second control node 103 via the communication channel 119 within the first-level communication network 113. The anonymous request 143 is received by the second control node communication module 117 of the second control node 103 and the second storage 139 is searched for the requested anonymous response data. If the anonymous response data 145 are found within the second storage 139 the anonymous response data 145 are retrieved from the second storage 139 and are transmitted to the first control node 101 via the communication channel 119, if an access condition is satisfied.

In particular, the access condition may be set by the first control node 101, by the second control node 103, by the first intermediary node 105, by the second intermediary node 107, by the particular application, and/or by the particular transaction or event that relates to the request, in order to protect data which originate from the second user node 111. In case the access condition is not satisfied, the second control node 103 generates a denial message (or a message indicating that the second control node does not contain the requested anonymous response data, if the second control node does not contain the requested anonymous response data) and transmits this denial message to the first control node 101 which transfers the denial message via the first intermediary node 105 to the first user node 109. The denial message may indicate that access to the requested response data is denied, i.e. is not allowed. This denial may be specific for the requesting first control node 101 and/or specific for the first intermediary node 105 according to an exemplary embodiment.

If access to the requested anonymous response data 145 is granted, the anonymous response data 145 are transmitted from the second control node communication module 117 to the first control node communication module 115 comprised in the first control node 101. From there the anonymous response data 145 are transmitted within the first second-level communication network 121 via the communication channel 125 to the first intermediary node 105.

From the received anonymous response data 145 the first intermediary node 105 derives response data 147 which allow identifying the first user node 109. In particular, the response data 147 comprise the transaction-related data or data derived therefrom, which finally allow the first user node 109 to decrypt the content data 135 which were received in an encrypted form.

Further, upon sending the request 141 or/and upon receiving the response data 147, the first user node 109 or the first intermediary node 105 may generate and transmit a notification message via the first control node 101, the second control node 103, the second intermediary node 107 to the second user node 111 to inform the second user node 111 that the content 135 has been accessed by the first user node 109.

In the context of the present application a control node may also be referred to as a clearing node or clearing instance, an intermediary node may also be referred to as a provider node or just a provider. In particular, the first control node 101 may be situated in Switzerland, while the second control node 103 may be situated in Luxembourg. In particular, the first control node 101 and the second control node 103 may be located in different political countries or in different jurisdictions.

The first control node communication module 115 of the first control node 101 is adapted to form another first-level communication network 114 with a further control node 104 (which may comprise a storage 142 and may be similarly configured as the second control node 103), the first-level communication network 113 being communicatively separated from the other first-level communication network 114. Thereby, the first control node communication module 115 is adapted to transmit, via the other first-level communication network 114, the anonymous request 143 to the further control node 104. In particular the further control node 104 may support another set of applications than the second control node 103.

The first control node 101 is adapted to transmit, via the other first-level communication network 114, the anonymous request 143 to the further control node 104 in a parallel manner with the transmission, via the first-level communication network 113, of the anonymous request to the second control node 103.

Figure 2:
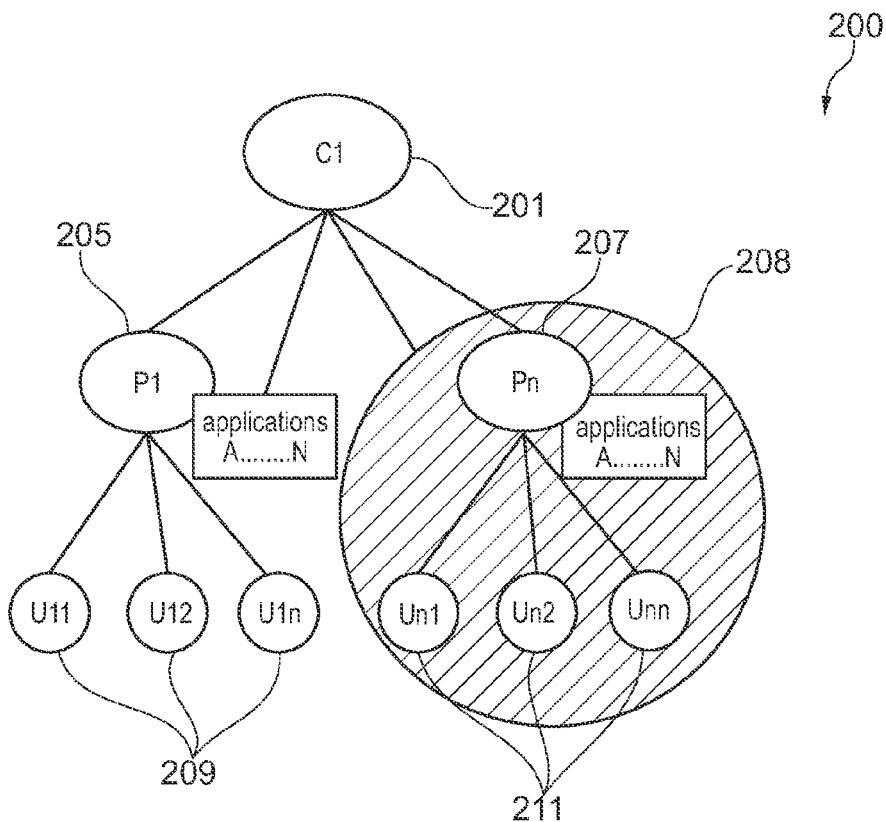
FIG. 2 schematically illustrates a conventional communication network.

FIG. 2 schematically illustrates a communication network according to findings by the inventors. Herein, a single control node or clearing node 201 is communicatively coupled to several providers 205 and 207 to which a plurality of user nodes 209 and 211 are connected, respectively.

Today's mufti-provider communication systems may have limitations. Referring to FIG. 2 many of today's communication systems may be multi-provider systems. Multiple providers (P1, . . . , Pn) offer the same communication services (A, . . . N) or a subset of such services, e.g. A only. Users (Uxy) may register with one of the providers and then use such service via the chosen provider (Px). Users may be humans but could also be computer programs. A synchronization node C1 (control node or clearing facility) 201 enables communication across providers 205, 207, i.e. independent of the provider that a user may choose, users can communicate with each other, i.e. collaborate and use the same application (application A, . . . , N) and/or service. For security-sensitive applications, users will select a trusted provider, as using such application (or app) X may require sharing information with selected provider, whereas other providers 205, 207 and control node C1 (201) shall only have restricted access or no access at all to information of user Uxy. The illustration in FIG. 2 shows the concept of such multi-provider systems. An example is regify with application (or app) A "trusted and binding e-mail", and applications (or apps) B, . . . N could be other digital postal services.

Area 208 denotes a TRUST relationship region (not geographical region) between provider Pn (207) and its users (211)

While such multi-provider system with central clearing C1 as illustrated in FIG. 2 offers choice for the users and reach due to the availability of multiple providers, it has its limitations for specific applications or apps.

The purpose of embodiments of this invention of a federated clearing and metering system is to resolve the following issues and limitations:

1. Sensitivity of an app SCx may contradict the concept of a central clearing
2. Network latency supports the concept of decentralized clearing as transactions can be processed more efficiently and faster "closer to home" with distributed clearing
3. Central clearing leads to the danger of a "single point of failure". In contrast, distributed clearing improves availability and reduces risks of failure.
4. Multi-app capabilities require flexibility to choose the clearing constellation on app level. In case, users use more than one app, it becomes likely, that a central clearing infrastructure and even a dedicated distributed one, will lack the flexibility required. Whereas a specific app may have to be operated on a dedicated clearing facility A, another specific app may be excluded from facility A. As clearing setups may differ from app to app, clearing must be determined on app level.
5. A user can be connected to the network independent of his actual communication profile. If there was a federated clearing setup that allowed a user/provider to flexibly include/exclude clearing constellations and avoid hard-wired clearing setups on app level, he would be connected to the whole network and still, provider/user could control clearing on the granular level of the app.
6. Central metering may be inappropriate or inefficient. One app may be metered on the basis of "number of users/period", whereas another may by "number of transactions/period". Federated clearing furthers specialization of clearing services, thereby improving efficiency including that for metering.
7. In the future, e-commerce transactions may have to be metered on app level, on provider level, and on the level of sovereign countries, e.g. in order to support VAT and other tax or compliance regimes.

Sensitivity of a particular application may contradict central clearing according to findings of the inventors.

Figure 3:
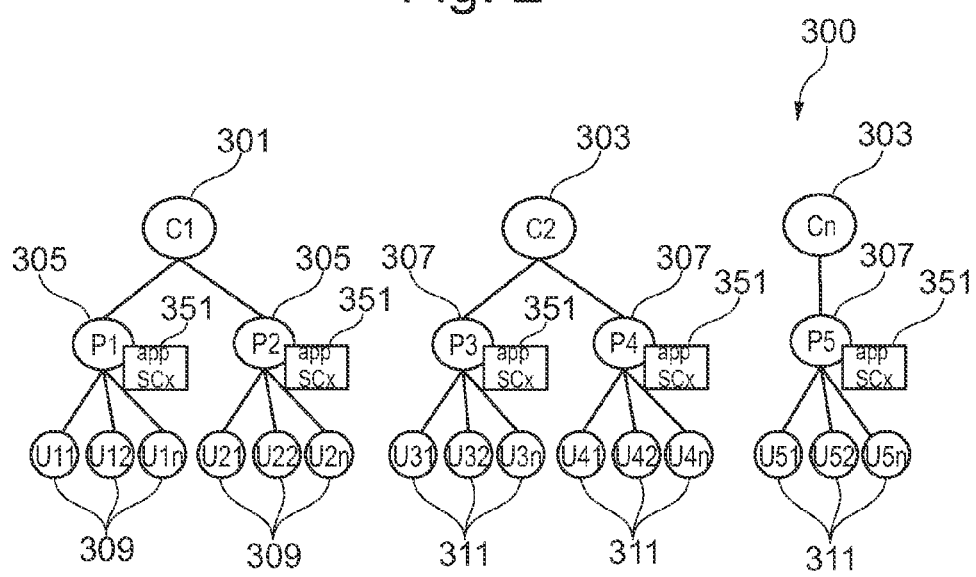
FIG. 3 schematically illustrates a communication network according to findings by the inventors.

FIG. 3 shows disconnected user groups in case of decentralized clearing with a purely central clearing approach according to findings by the inventors. Herein, a first clearing node 301 and two second clearing nodes 303 are provided, wherein each clearing node 301, 303 is connected to one or more provider nodes 305 and 307, respectively. Associated with the providers 305, 307 are a number of applications 351.

Referring to FIG. 3, one group of users (309) may accept that app SCx is centrally enabled by Cx, while another group (311) may not accept this. If e.g. C1 was located in the European Union, EU users may accept this, while non-EU users may not consider this acceptable. In particular in cases where the clearing facility stores keys or other transactional information (example: SWIF), jurisdiction and therefore access may become critical. If C1 was relocated to another country or governance changed otherwise, another set of users may disagree. Consequently, for reasons of global acceptance, the clearing facility may have to be decentralized in order to serve the specific user requirements as otherwise, the restrictions of a purely central approach to clearing would lead to dedicated (fairly inefficient) setups of the complete clearing infrastructure as illustrated below. Besides adding cost, such setup would also limit reach as for example, user U41 is not connected to user U11 and could not communicate with him. Therefore, user U41 would have to register twice in such case.

Figure 4:
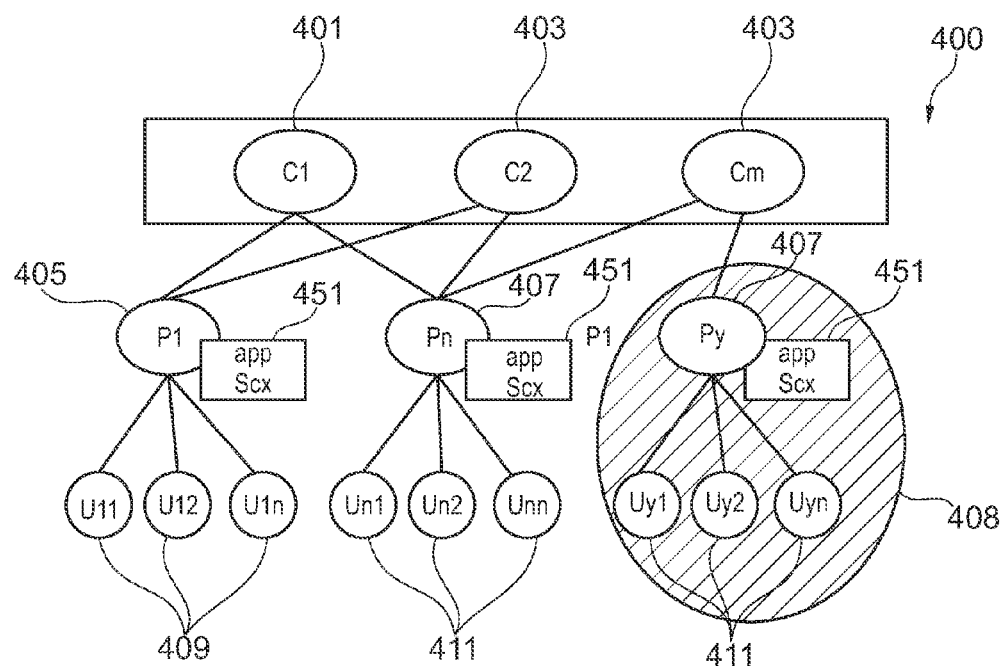
FIG. 4 schematically illustrates a communication network according to findings and considerations by the inventors.

FIG. 4 schematically illustrates a federated clearing system according to findings by the inventors, which may be regarded as an extension of the system illustrated in FIG. 3. In particular, the FIG. 4 illustrates the new flexibility for users brought about by a federated clearing system for app SCx:

User Group (Uyx) will only use the clearing facility Cm for app SCx

User Group (Ulx) will use the clearing facilities C1 and C2 for app SCx

User Group (Unx) will use the clearing facilities C1, C2 and Cm.

Therefore, individual users can choose their preferred clearing constellation. Also, on the level of organizations (user groups), an appropriate provider setup (e.g. Py) may ensure that the clearing setup can be chosen. Consequently, providers will benefit, if they can set up an app with the clearing constellation. In case of Pn, a provider that leverages the clearing infrastructure to its fullest, may simply leave the decision where to clear to the clearing organizations (e.g. based on traffic).

Alternatively, choosing the sequence (C2, Cm, C1) will give such provider additional steering means. In this example C2: first, Cm: 2nd (if C2 is unavailable), C1: 3rd priority.

As illustrated in FIG. 4, dedicated services may be offered (Py, Cm) that can be restricted and controlled down to clearing/provider level—and still connection to the global communication network may be maintained. For example, a country could run eGovernment services in a fully controlled manner (Cm=clearing operator chosen by this country; Py=provider chosen) and still, access to the communication network may be ensured. The federated clearing system as illustrated in FIG. 4 also reduces the risks associated with the danger of a single point of failure.

Further, Multi-application capabilities may require federated clearing.

Figure 5:
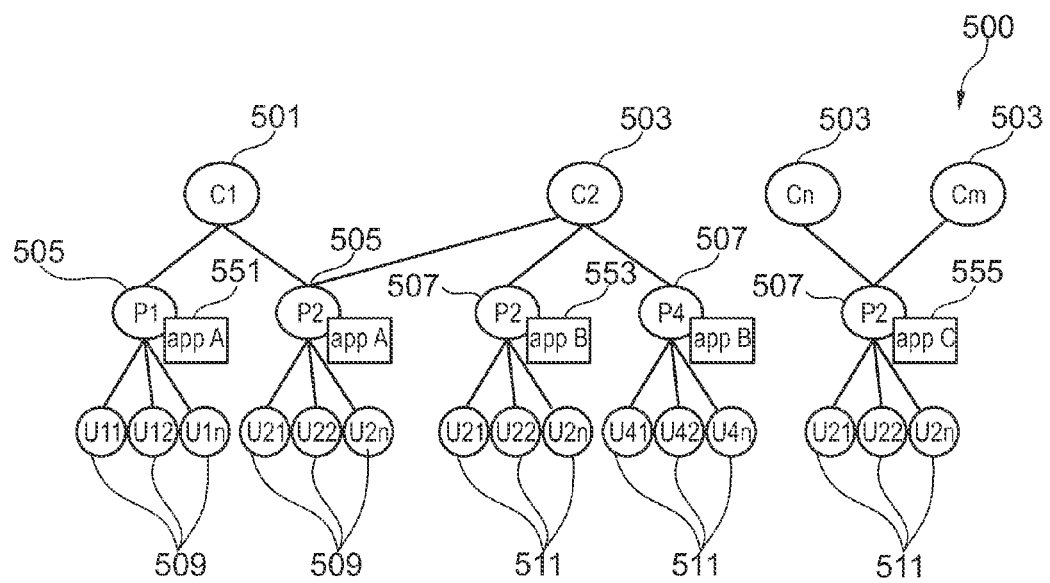
FIG. 5 schematically illustrates a communication network according to findings and considerations by the inventors.

What in terms of decentralized, dedicated clearing could (with some overhead) be achieved on the level of a single app, becomes outmost challenging in a multi-application world in which apps may require specific clearing constellations. The following example of FIG. 5 illustrates this challenge for provider P2 with three distinct apps A, B and C, that shall be cleared by clearing facilities C1/C2, C2 and Cn/Cm respectively. It becomes obvious that, compared to the system according to an embodiment of the present invention illustrated in FIG. 1, such setup would require significant overhead with still limited redundancy and little flexibility.

FIG. 5 schematically illustrates a communication network 500 according to findings by the inventors, wherein a number of different applications 551, 553 and 555 are provided by the provider nodes 505 and 507.

The concept of federated clearing applied to above scenario illustrated in FIG. 5 facilitates P2's job within one single multi-cleared multi-provider system. Benefits may be: improved redundancy, clearing setup on application level, users are part of the whole network, clearing rules on app level allow a user and/or a provider to determine the clearing setup for each app. Local regulations can be effected down to the level of the individual app.

Figure 6:
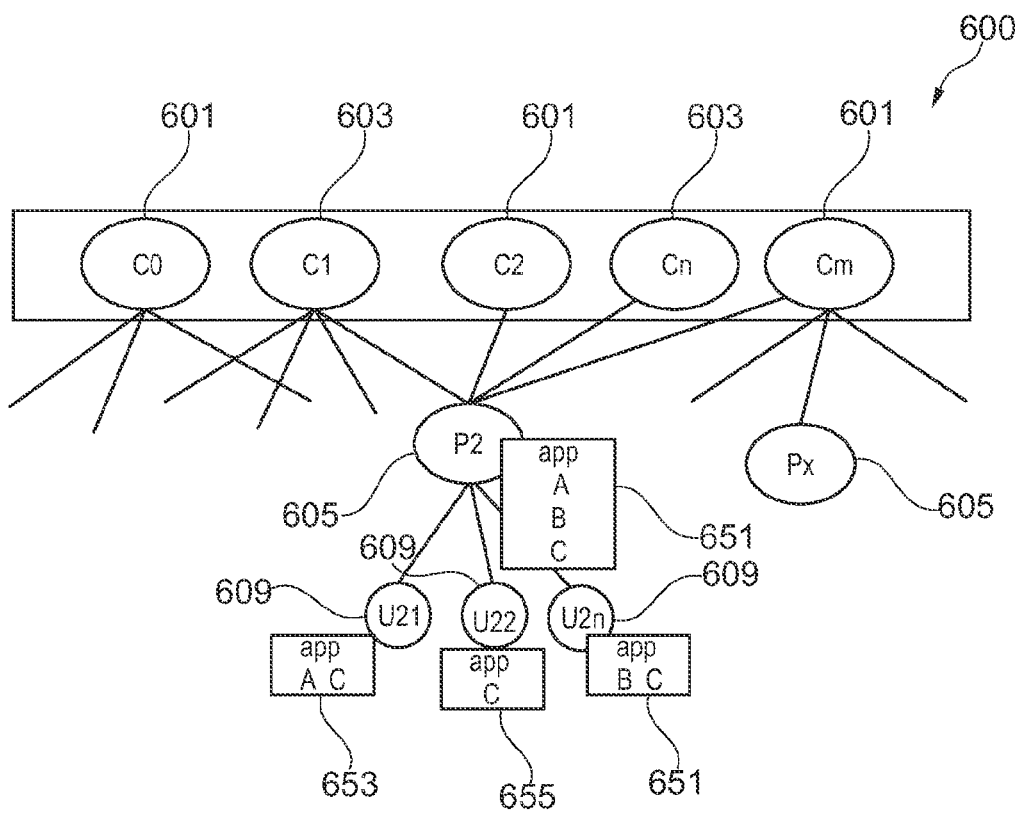
FIG. 6 schematically illustrates a communication network according to findings and considerations by the inventors.

FIG. 6 schematically illustrates a communication network or federated clearing system 600 according to findings by the inventors involving many-to-many relationships between intermediary nodes 605 and control nodes 601, 603. Herein, the provider node 605 provides a number of applications A, B, C, (labelled by reference sign 651) each user node 609 may select or choose from the available applications 651 to derive a subset 653 of the available applications 651. Further, each user 609 may choose clearing options specific for the selected application.

In FIG. 6 provider P2 offers a selection of apps. app A may be cleared at Cm only (e.g. government mandate), app B at C0 or C1 (e.g. EU or CH), and app C at any clearing facility (e.g., at the most efficient at a given point in time).

User U2n chooses the subset of apps from his provider's offering that user wants to use; only one account required for multi-app use. The user may also choose clearing options at app level, e.g. cleared in EU or CH or USA.

Such multi-application, multi-provider and multi-clearing environment illustrated in FIG. 6 may provide the highest flexibility possible and, while giving the user freedom to choice, it also satisfies requirements of providers with regards to local compliance, tax and regulations issues.

Figure 7:
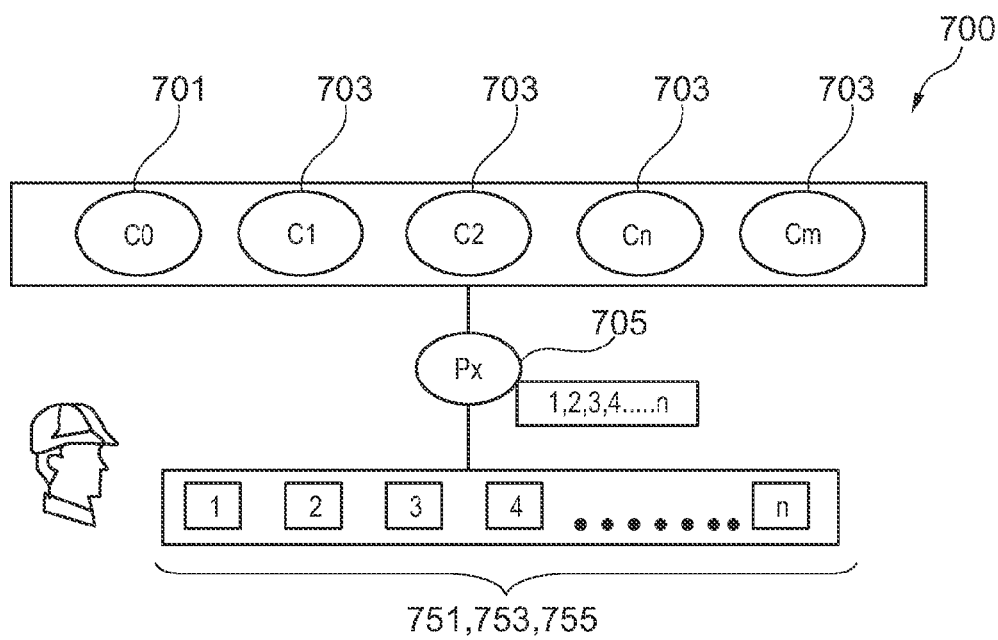
FIG. 7 schematically illustrates a communication network according to findings and considerations by the inventors.

FIG. 7 illustrates a user's multi-app selection (1 . . . n) with only one account with one provider. Below some examples of applications 1, 2, 3, 4 as illustrated in FIG. 7 are listed:

app 1: eGov app regulated by the local government; may only be operated by local provider Px; clearing may only be done in local clearing facility Cm; service not offered elsewhere app 2: e-commerce purchase transaction; taxation may require clearing/metering in country x where service was consumed (Px) or in country y where service was produced (Py); or dual processing in Px+Py, e.g. in case of specific cross-border taxation; app may be setup with respective parameters.

app 3: global mobile remittances with central clearing in order to register money transfer transaction and to certify validity of transactions. Governance may also require distributed clearing (e.g. EU, Asia, USA).

app 4: regify trusted and binding e-mail service; clearing may take place wherever provider chooses, e.g. 5 clearing facilities may offer the clearing service; provider Px may select facility 1 and 3.

FIG. 7 schematically illustrates a communication network 700 according to findings by the inventors. Herein, the control nodes 701, 703 may allow clearing or administering a plurality of applications 1, 2, 3, 4, . . . n which are provided to a user node.

Figure 8:
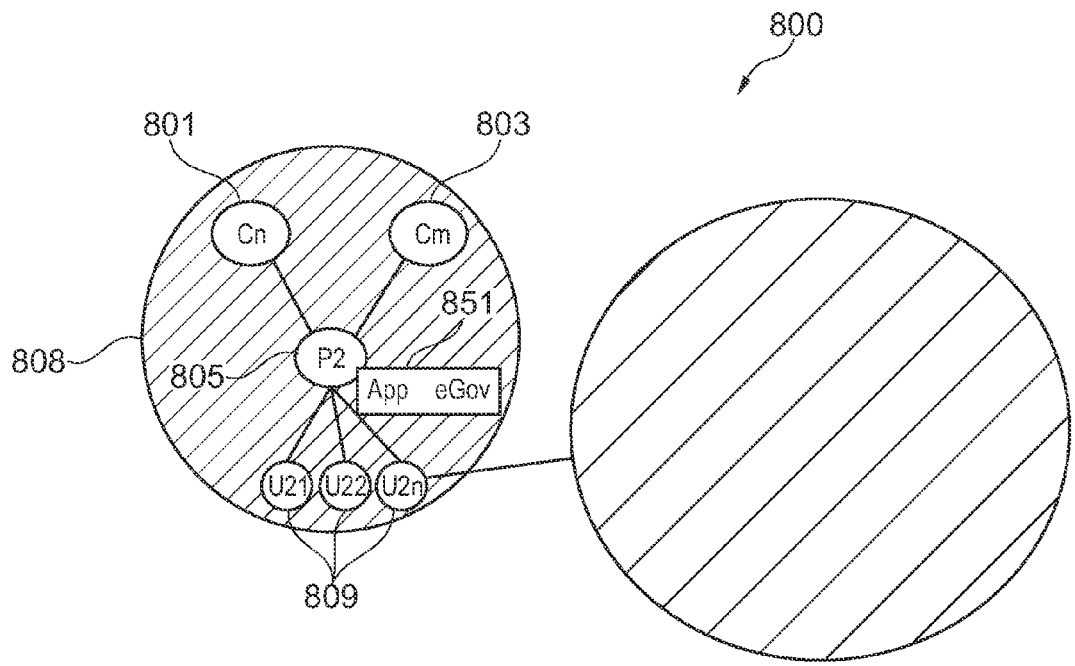
FIG. 8 schematically illustrates a communication environment according to findings and considerations by the inventors.

FIG. 8 schematically illustrates a trusted environment according to findings by the inventors. In particular, FIG. 8 illustrates an example of a dedicated service (eGovernment, e.g.), wherein a TRUSTED and SELF-SUSTAINING environment for dedicated eGov service and provider is established. Autarkic governance is provided, as both providers and clearing can be freely chosen by authorities. Still, users continue to be connected to the whole communication system, e.g. for other services with the same user account.

Figure 9:
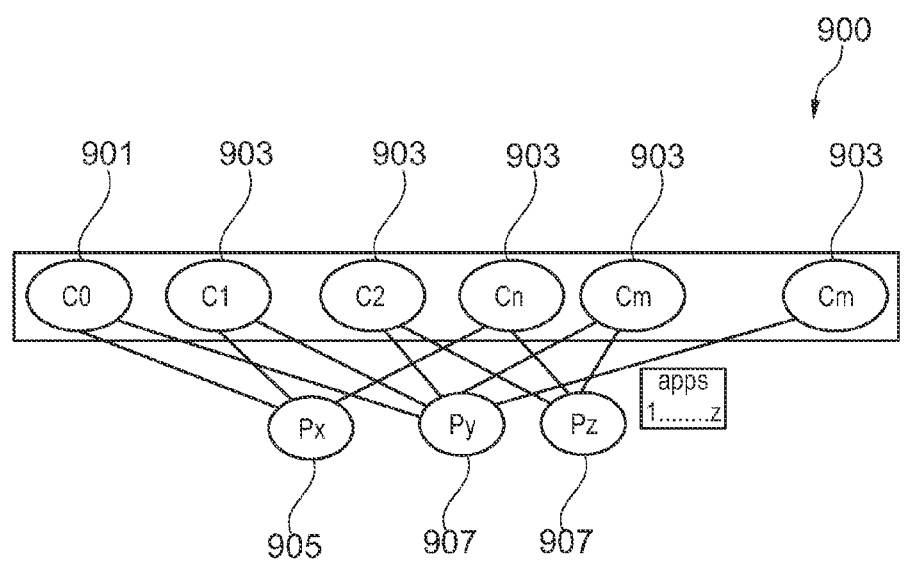
FIG. 9 schematically illustrates an architecture of a communication network according to findings and considerations by the inventors.

FIG. 9 schematically illustrates a communication network according to findings by the inventors, wherein plural control nodes 901, 903 are connected to plural provider nodes 905, 907.

According to findings by the inventors, a roaming Architecture for federated clearing and metering is provided as illustrated in FIG. 9.

Instead of hardwiring many-to-many connections between providers and clearing facilities (e.g. via VPNs) in order to get access to clearing data (e.g. keys of a regify transaction), a roaming process may be more flexible. FIG. 9 illustrates a multi-application communication system with federated but hard-wired clearing and metering.

Figure 10:
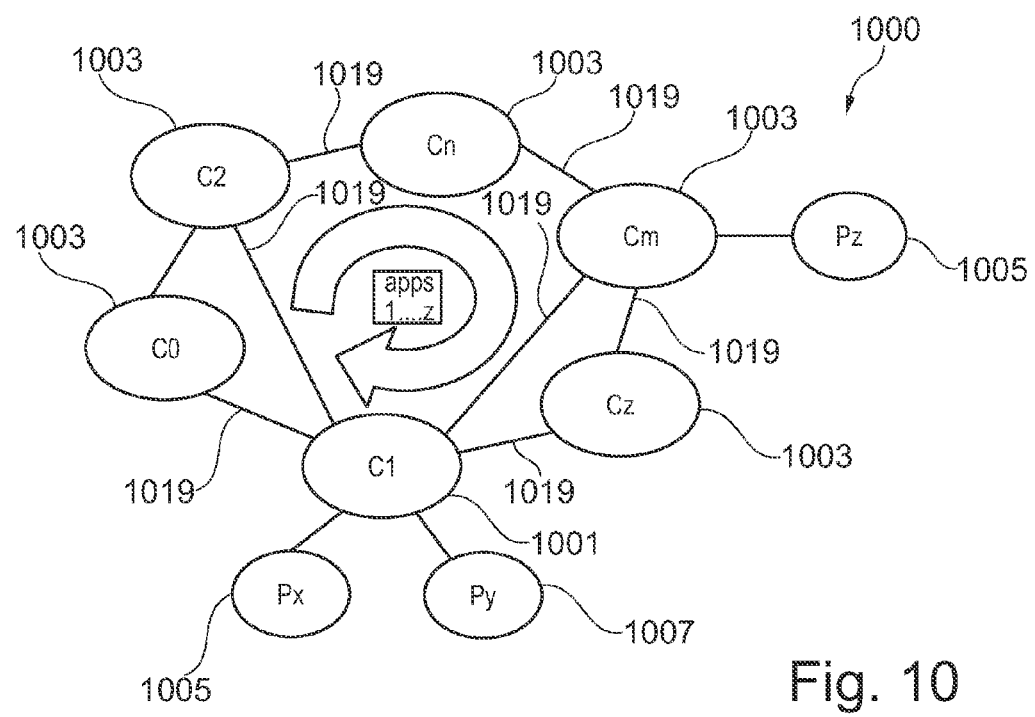
FIG. 10 schematically illustrates a communication network according to an embodiment of the present invention.

FIG. 10 schematically illustrates a communication network 1000 according to another embodiment of the invention. In particular, the communication network 1000 may also be considered as a roaming architecture for a multi-application communication system with federated clearing and metering, wherein the communication network 1000 comprises control nodes or clearing nodes 1001, 1003, wherein particular pairs of the control nodes 1001, 1003 form first-level communication networks providing communication channels 1019 between two control nodes 1001, 1003, respectively. In particular, each communication channel 1019 may represent a separate virtual private network. In particular, one or more user nodes may be communicatively coupled to the intermediary nodes 105 which are not illustrated for simplicity. User requests directed to the intermediary node 105 may be forwarded in an anonymized form to the control node 1001 which may forward or roam the anonymous request to another of the control nodes 1001, 1003 using the communication channel 1019. Thereby, the different control nodes 1001, 1003 may be located in different jurisdictions.

In particular, FIG. 10 illustrates a roaming architecture for multi-application communication system 1000 with federated clearing and metering. Thereby providers only need to be connected to one clearing service and the clearing services are connected as appropriate.

As the number of providers will outnumber that of clearing facilities for most of the apps, it may be appropriate to hard-wire on the level of clearing facilities and connect providers through one clearing facility only and have a roaming dialogue in case the respective clearing facility does not have the required clearing information.

Still, a provider could be connected to more than one clearing facility, e.g. in case of dedicated services (e.g. eGov). Roaming may be defined as or comprise the searching, authentication and exchange process regarding clearing and/or metering information between clearing facilities. Roaming is effected whenever one clearing facility needs clearing information in order to process a transaction and this clearing information is stored/managed elsewhere, i.e. in another clearing facility.

Technically, the roaming process may rather be an "asynchronous call upon request" (near-real-time request) than a parallel request that would require high-speed connections and high-end technical infrastructure. Such call upon request would be more robust as well as it would work in heterogeneous environments, i.e. in a clearing federation with global clearing facilities under different governance rules. To give an example: in case, C1 will initiate a roaming call to C2 and Cz, such calls could be parallel or serial ones, e.g. call to Cz would only be initiated if call to C2 was unsuccessful.

Further, roaming capabilities may provide to enable various governance regimes.

In particular, roaming (in particular an access condition for roaming requests and/or forwarding response data) may be set up on different levels as listed under points 1. to 3. below:

1. User and User Group

A user/user group may determine to enable or disable roaming for a certain app A. If he chooses to disable roaming for app A and starts an app A transaction, then clearing data (keys, etc.) will reside at the clearing facility only where the user is registered. In case of "roaming disabled", the communication partner of that user will also have to be registered with the same clearing facility, because the clearing facility may not share data in case of "roaming disabled". This roaming setting guarantees that clearing data will always reside in the trusted domain that this user group has chosen. In contrast, "roaming enabled" enables a roaming dialogue between clearing facilities. In case, a users has multiple apps, some may be "roaming enabled" while others may be not.

2. Provider

Providers may be set up as "roaming enabled" or "roaming disabled". Latter setup option may be the choice of authorities that want to set up national eGovernment apps and must be in a position to solely control governance.

3. Clearing Facility

Clearing facility have the freedom to choose the set of clearing partners they want to roam with in order to exchange clearing data. Of course, this choice can either be made globally (for all apps that a clearing facility clears/meters) or for each app on an individual basis. As a result, a clearing facility can support a variety of apps with diverse clearing schemes. Whereas roaming may be disabled for an eGovernment app, selective roaming may be supported for app B, and full roaming for app C.

Figure 11:
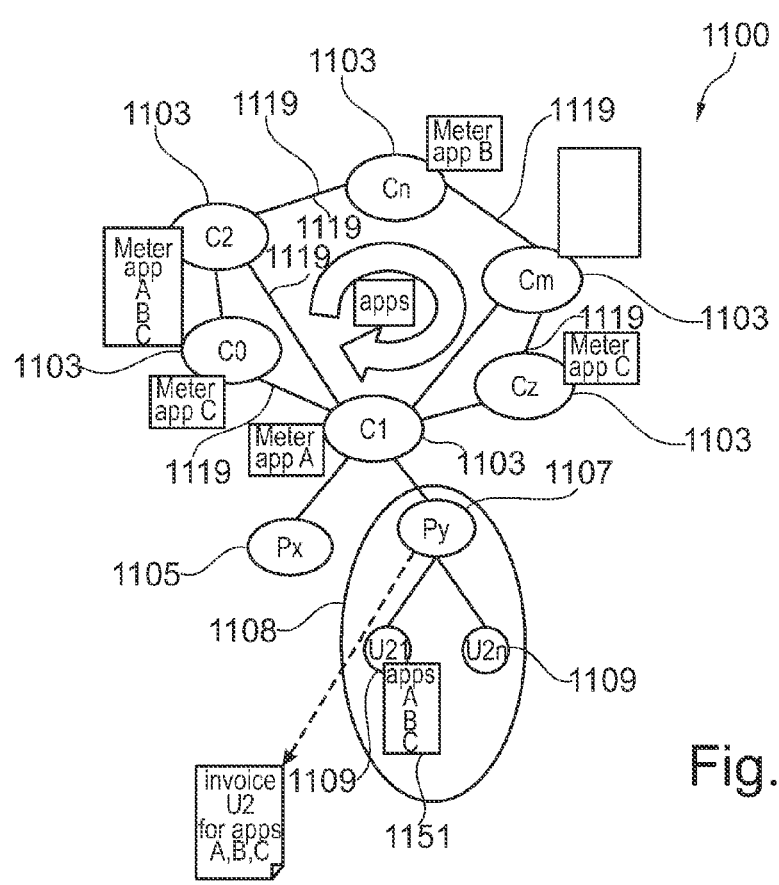
FIG. 11 illustrates a communication network according to an embodiment of the present invention.

Examples for roaming schemes down to the level of individual apps are given below:
Constellation for app B may be:
user A may choose "roaming disabled"
user B may choose "roaming enabled" (will only have an effect, if provider of user B enables roaming for app B)
provider 1 may pick clearing facilities 3 and 12 for app B roaming
provider 2 may choose "free roaming" and let some "most efficient" algorithm determine roaming process for app B
Constellation for app C may be:
user B may choose "roaming disabled"
user A may choose "roaming enabled"
provider 2 may pick clearing facilities 1 and 12 for app C roaming (e.g. for legal reasons, technical reasons (latency) or other)
provider 1 may disable roaming for app C due to local regulations and legal issues
eGovernment app may be limited to dedicated provider and clearing facilities right from the outset FIG. 11 schematically illustrates another communication network 1100 according to an embodiment. The communication network 1100 illustrated in FIG. 11 differs from the aforementioned embodiments of a communication network in that it allows metering (i.e. measuring of data access, in particular for invoicing) of applications used by the user node or measuring or metering content requested and accessed by the user node.

In FIG. 11 federated anonymous metering is illustrated as a multi-application communication system with federated clearing and metering.

Federated clearing opens up opportunities for specialization of clearing services. This may also include metering. As clearing services may flexibly support all apps, a subset of apps, or only a dedicated one (e.g. eGov), metering can be decentralized as well as metering can be part of the clearing service. Typically, metering (and billing as the direct follow-on process) may consume significant resources and costs, in particular, if diverse metering concepts need to be supported in one central clearing instance. Hardware and software requirements must be derived from the metering concept. Metering of dedicated clearing instances reflects the specialization of respective clearing service and leads to efficient, distributed metering services.

Billing user U21 by provider Py may trigger a roaming dialogue in order to collect metering data from clearing facilities that may have served U21's requests within the billing period. Py may collect this usage data from the distributed meters individually per user, or for its complete user base. Advantages of this kind of federated, anonymous metering are manifold:

specialized clearing facilities can do the metering more efficiently metering data is anonymous on clearing level and may therefore re-side anywhere (Asia, North America, EU, etc.) without affecting data privacy laws and regulations metering data will only become user-related on provider level (at level of trust relationship)

U21 has "one face to the customer" via Py

Py to own customer relationship

Py can consolidate metering data per app used into a billing statement for U21 roaming process for metering follows the roaming setup for clearing

Figure 12:
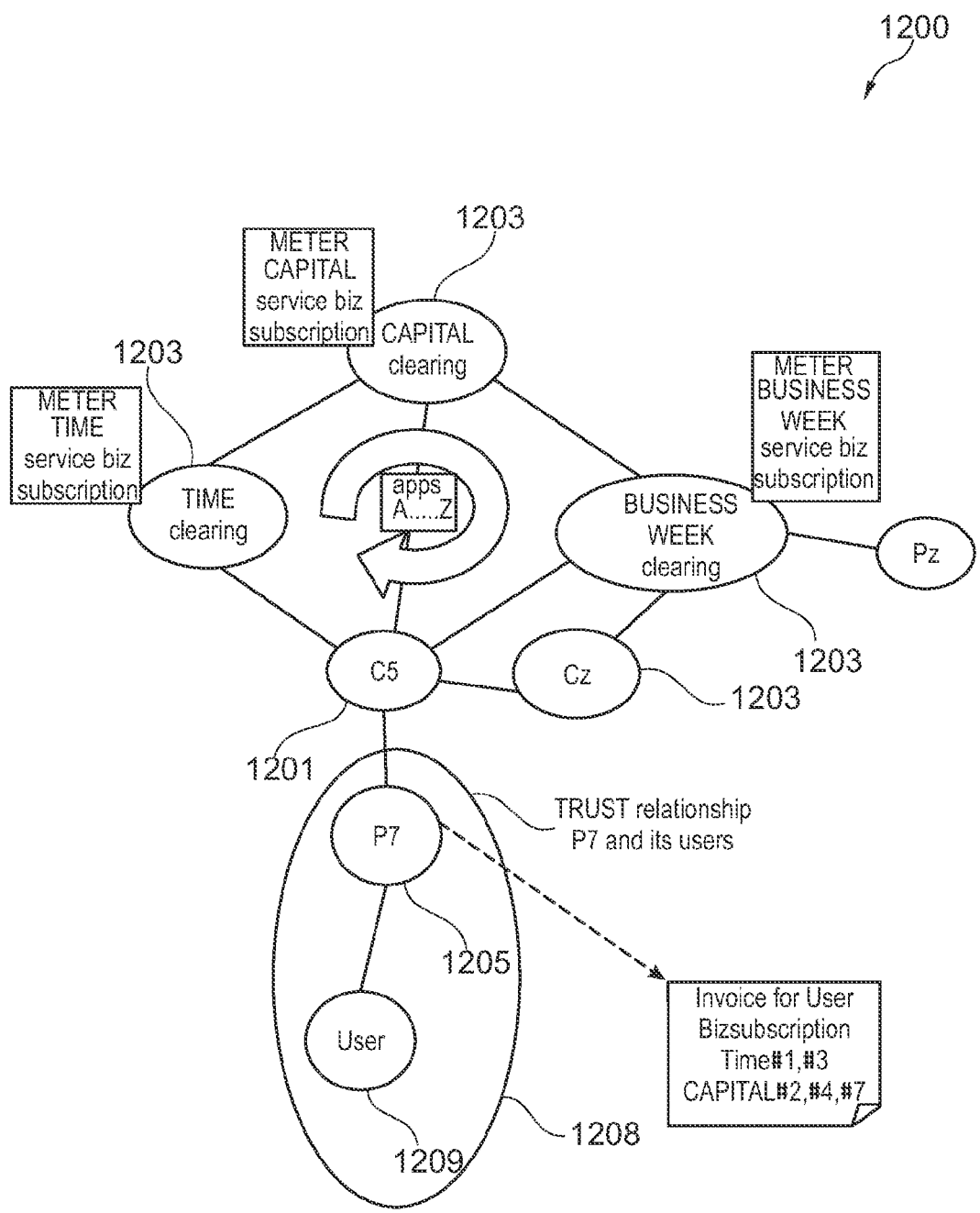
FIG. 12 schematically illustrates a communication network according to an embodiment of the present invention.

FIG. 12 schematically illustrates another communication network 1200 according to an embodiment of the present invention. Herein, a subscription on demand of a newspaper may be charged based on actual access to the particular newspaper content being accessed.

In particular, FIG. 12 illustrates an example for federated anonymous metering for subscriptions of content data.

Herein, a user for app "biz subscription" may receive a regify message in his inbox that contains digital contents as agreed between P7 and user in a subscription on demand service: a selection of articles from TIME Magazine, BUSINESS WEEK and CAPITAL. Articles may be available to the user as abstracts, and only upon confirming by clicking "if you want to read this article in full, you will be charged X Cents", the user will have access to the article(s) (that may be part of the regify message or shipped independently). The "biz subscription" service will register the purchasing requests, pass them on to the user's provider P7, that will anonymize the requests, pass them on to the clearing facility C5 (selection of clearing facility at the discretion of P7) that will effect roaming with clearing facilities of TIME, BUSINESS WEEK and/or CAPITAL respectively. These facilities will register the purchasing events, pass purchasing keys on and through the chain of clearing and providers, keys will make available requested digital contents to the user. The user expects and will receive one billing statement only from his trusted provider P7 of "biz subscription" app.

User may share his preferences with P7; profile may only be passed on by P7 anonymously and upon prior consent. Subscription services according to a user's profile across different content providers are superior for the user. Also, the user receives one billing statement only.

User may choose particular articles #1, #2, #3, #4, #7 in his "on demand" Biz subscription in the respective billing period. Provider P7 may act as the trusted intermediary and "Biz subscription Intermediary" vis-à-vis content owners.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A first control node, comprising;
a first control node communication module for forming a first-level communication network with at least one second control node;

a first intermediary node communication module for forming a first second-level communication network with a first intermediary node, the first second-level communication network being communicatively separated from the first-level communication network; and at least one processor and memory implementing the first control node communication module and the first intermediary node communication module;

wherein the first intermediary node communication module is adapted, using the at least one processor and memory, to receive an anonymous request from the first intermediary node, the anonymous request being based on a first user request comprising personal data and being transmitted from a first user node to the first intermediary node, wherein the first control node communication module is adapted, using the at least one processor and memory, to transmit, via the first-level communication network, the anonymous request to the second control node; and to receive, via the first-level communication network, anonymous response data, responding to the anonymous request, from the second control node;

wherein the first intermediary node communication module is further adapted to transmit the anonymous response data, via the first second-level communication network, to the first intermediary node for transmission of response data which are based on the anonymous response data to the first user node, wherein the first control node further comprises:

a first storage for storing data, wherein the first storage is searchable, based on the anonymous request, for the anonymous response data, wherein the first control node is adapted to transmit, via the first-level communication network, the anonymous request to the second control node, if the anonymous response data are not contained in the first storage, wherein a second user node is adapted to provide access, upon a transaction, of encrypted content data to the first user node, wherein upon providing the encrypted content data to the first user node, the second user node transmits transaction-related data, being related to the transaction of the encrypted content data, to a second intermediary node, the transaction-related data to be received at the second control node as anonymous transaction-related data, wherein the anonymous transaction-related data is separate from the encrypted content data, wherein the transaction-related data are indicative of a decryption key for decrypting the encrypted content data, wherein the transaction-related data are indicative of the anonymous response data.

2. A second control node, comprising:

a second control node communication module for forming a first-level communication network with at least one first control node;

at least one processor and memory implementing the second control node communication module; and a second storage for storing control node data, wherein the second control node communication module is adapted, using the at least one processor and memory, to receive, via the first-level communication network, an anonymous request from the first control node, the anonymous request being based on a first user request comprising personal data, wherein the second storage is adapted to retrieve, based on the anonymous request, anonymous response data, responding to the anonymous request, from the second storage, wherein the second control node communication module is adapted, using the at least one processor and memory, to transmit, via the first-level communication network, the anonymous response data to the first control node, the second control node further comprising:

a second intermediary node communication module for forming a second second-level communication network with a second intermediary node, the second second-level communication network being communicatively separated from the first-level communication network, the at least one processor and memory implementing the second intermediary node communication module;

wherein the second intermediary node communication module is adapted, using the at least one processor and memory, to receive anonymous transaction-related data from the second intermediary node;

wherein the second storage is adapted to store the anonymous transaction-related data;

wherein a second user node is adapted to provide access, upon a transaction, of encrypted content data to a first user node, wherein upon providing the encrypted content data to the first user node, the second user node transmits the transaction-related data, being related to the transaction of the encrypted content data, to the second intermediary node, wherein the transaction-related data are indicative of a decryption key for decrypting the encrypted content data, wherein the anonymous transaction-related data are indicative of the anonymous response data, wherein the anonymous transaction-related data is separate from the encrypted content data.

3. A communication network, comprising:

a first control node, comprising:

a first control node communication module for forming a first-level communication network with at least one second control node;

a first intermediary node communication module for forming a first second-level communication network with a first intermediary node, the first second-level communication network being communicatively separated from the first-level communication network; and at least one processor and memory implementing the first control node communication module and the first intermediary node communication module;

wherein the first intermediary node communication module is adapted, using the at least one processor and memory of the first control node, to receive an anonymous request from the first intermediary node, the anonymous request being based on a first user request comprising personal data and being transmitted from a first user node to the first intermediary node, wherein the first control node communication module is adapted, using the at least one processor and memory of the first control node, to transmit, via the first-level communication network, the anonymous request to the second control node; and to receive, via the first-level communication network, anonymous response data, responding to the anonymous request, from the second control node;

wherein the first intermediary node communication module is further adapted
to transmit the anonymous response data, via the first second-level communication network, to the first intermediary node for transmission of response data which are based on the anonymous response data to the first user node,
wherein the first control node further comprises:
a first storage for storing data,
wherein the first storage is searchable, based on the anonymous request, for the anonymous response data,
wherein the first control node is adapted to transmit, via the first-level communication network, the anonymous request to the second control node, if the anonymous response data are not contained in the first storage,
wherein the a second user node is adapted to provide access, upon a transaction, of encrypted content data to the first user node, wherein upon providing the encrypted content data to the first user node, the second user node transmits the transaction-related data, being related to the transaction of the encrypted content data, to a second intermediary node, the transaction-related data to be received at the second control node as anonymous transaction-related data,
wherein the anonymous transaction-related data is separate from the encrypted content data,
wherein the transaction-related data are indicative of a decryption key for decrypting the encrypted content data,
wherein the transaction-related data are indicative of the anonymous response data, the communication network further comprising:
at least one second control node according to claim 2, wherein the first control node and the second control node form a first-level communication network which communicatively couples the first control node to the second control node,
wherein the first control node comprises the first intermediary node communication module for forming the first second-level communication network between the first control node and the first intermediary node, wherein the first intermediary node communication module is adapted, using the at least one processor and memory of the first control node,
to receive an anonymous request from the first intermediary node, the anonymous request being based on a first user request transmitted from a first user node to the first intermediary node,
wherein the first control node is adapted, using the at least one processor and memory of the first control node,
to transmit the anonymous request to the second control node,
wherein the second control node is adapted, using the at least one processor and memory of the second control node,
to receive the anonymous request from the first control node, to determine anonymous response data responding to the anonymous request, and to transmit the anonymous response data to the first control node,
wherein the first control node is adapted, using the at least one processor and memory of the first control node,
to receive the anonymous response data from the second control node;
wherein the first intermediary node communication module is further adapted, using the at least one processor and memory of the first control node,
to transmit the anonymous response data to the first intermediary node for transmission of response data, which are based on the anonymous response data, to the first user node.

4. Communication network according to claim 3, further comprising:
the first intermediary node, wherein the first second-level communication network is a private network communicatively separated from the first-level communication network.

5. Communication network according to claim 3, further comprising:
a second intermediary node,
wherein the second control node further comprises a second intermediary node communication module for forming a second second-level communication network between the second control node and the second intermediary node, wherein the second intermediary node communication module is adapted to receive anonymous transaction-related data from the second intermediary node,
wherein the second control node comprises a storage to store the anonymous transaction-related data.

6. Communication network according to claim 3, further comprising:
the first user node communicatively coupled to the first intermediary node via a public communication network;
the second user node communicatively coupled to the second intermediary node via the public communication network,
wherein the second user node is adapted to transmit transaction-related data to the second intermediary node, wherein based on the transmitted transaction-related data the second intermediary node derives the anonymous transaction-related data to be transmitted to the second control node.

7. Communication network according to claim 6, wherein the second user node is adapted to generate the encrypted content data for transmission to the first user node.

8. Communication network according to claim 6, wherein the transaction-related data are further indicative of a hashcode of an identification information identifying the first user node.

9. Communication network according to claim 8, wherein the first user request transmitted from the first user node to the first intermediary node is indicative of the identification information identifying the first user node.

10. Communication network according to claim 3, wherein the first control node, the second control node and the second intermediary node are adapted, upon receiving the anonymous request or upon transmitting the anonymous response data to the first intermediary node, to transmit an access notification from the first control node via the second control node and via the second intermediary node to the second user node, wherein the access notification indicates that the first user node has accessed the content data.

11. Communication network according to claim 6, wherein the first user node is adapted to provide access to the content data by decrypting the encrypted content data by means of the decryption key derived from the response data.

12. A first communication method, comprising:
providing a first control node comprising
a first control node communication module for forming a first-level communication network with at least one second control node;

a first intermediary node communication module for forming a first second-level communication network with a first intermediary node, the first second-level communication network being communicatively separated from the first-level communication network; and at least one processor and memory implementing the first control node communication module and the first intermediary node communication module;

providing, by a second user node, upon a transaction, access of encrypted content data to a first user node, wherein upon providing the encrypted content data to the first user node, the second user node transmits transaction-related data, being related to the transaction of the encrypted content data, to a second intermediary node, the transaction-related data to be received at the second control node as anonymous transaction-related data, wherein the anonymous transaction-related data is separate from the encrypted content data, wherein the transaction-related data are indicative of a decryption key for decrypting the encrypted content data, wherein the transaction-related data are indicative of anonymous response data;

transmitting a first user request comprising personal data from the first user node to the first intermediary node;

receiving, by the first intermediary node communication module using the at least one processor and memory of the first control node, an anonymous request from the first intermediary node, the anonymous request being based on the first user request;

searching, in a first storage of the first control mode, based on the anonymous request, for the anonymous response data;

transmitting, by the first control node communication module using the at least one processor and memory of the first control node, via the first-level communication network, the anonymous request to the second control node, if the anonymous response data are not contained in the first storage;

receiving, using the at least one processor and memory of the first control node, via the first-level communication network, the anonymous response data, responding to the anonymous request, from the second control node; and transmitting, by the first intermediary node communication module using the at least one processor and memory of the first control node, the anonymous response data, via the first second-level communication network, to the first intermediary node for transmission of response data which are based on the anonymous response data to the first user node.

13. A second communication method, comprising:
providing a second control node comprising
a second control node communication module for forming a first-level communication network with at least one first control node,
a second storage for storing control node data;
a second intermediary node communication module for forming a second second-level communication network with a second intermediary node, the second second-level communication network being communicatively separated from the first-level communication network; and
at least one processor and memory implementing the second control node communication module and the second intermediary node communication module;
providing, by a second user node, access, upon a transaction, of encrypted content data to a first user node, wherein upon providing the encrypted content data to the first user node, the second user node transmits transaction-related data, being related to the transaction of the encrypted content data, to the second intermediary node, wherein the transaction-related data are indicative of a decryption key for decrypting the encrypted content data;
receiving, using the at least one processor and memory of the second control node, anonymous transaction-related data from the second intermediary node at the second control node, wherein the anonymous transaction-related data is separate from the encrypted content data;
storing, in the second storage, the anonymous transaction-related data;
receiving, by the second control node communication module using the at least one processor and memory of the second control node via the first-level communication network, an anonymous request from the first control node, the anonymous request being based on a first user request comprising personal data;
retrieving, from the second storage, based on the anonymous request, anonymous response data, responding to the anonymous request; and
transmitting, by the second control node communication module using the at least one processor and memory of the second control node, via the first-level communication network, the anonymous response data to the first control node,
wherein the anonymous transaction-related data are indicative of the anonymous response data.

14. A non-transitory computer-readable medium, in which a computer program is stored which, when being executed by a processor, is adapted to control or carry out a method according to claim 12.

* * * * *